United States Patent [19]
Knapp

[11] 3,792,812
[45] Feb. 19, 1974

[54] THERMOSTATIC MIXING COCK
[76] Inventor: Alfons Knapp, Bleicherstrasse 3, Biberach/Riss, Germany
[22] Filed: Feb. 6, 1973
[21] Appl. No.: 330,037

[30] Foreign Application Priority Data
Feb. 29, 1972 Italy..............................67630/72

[52] U.S. Cl............................................. 236/12 R
[51] Int. Cl. .......................................... G05d 23/00
[58] Field of Search .................................. 236/12 R

[56] References Cited
UNITED STATES PATENTS
3,036,777   5/1962   Budde................................. 236/12
3,388,861   6/1968   Harding............................... 236/12

*Primary Examiner*—William E. Wayner
*Attorney, Agent, or Firm*—Young & Thompson

[57] ABSTRACT

A thermostatic mixing cock, wherein the passages for the hot and cold water within the body of the cock are mutually spaced in axial direction and, in the mounted cock, they are separated the one another by a tubular ring provided with a sealing gasket seated between said passages, the tubular ring is kept in position by a detachable body portion, and several radial passages serve for allowing the hot and cold water respectively to pass through the tubular ring, to an inner cavity wherein a control member is axially movable under action of a handle and contains a thermostatic control device.

11 Claims, 6 Drawing Figures

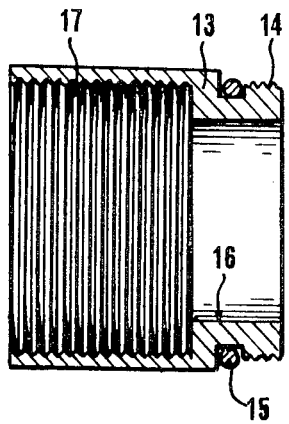
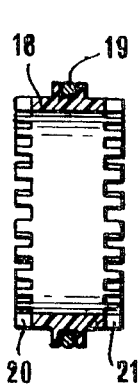
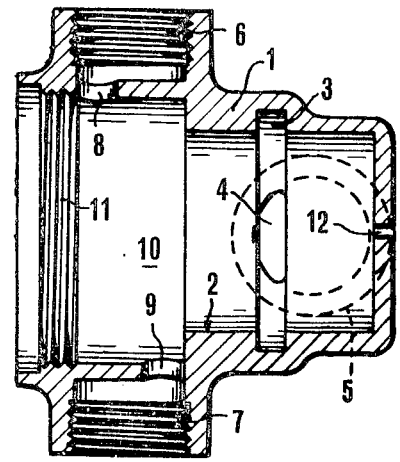
Fig. 5   Fig. 4   Fig. 3
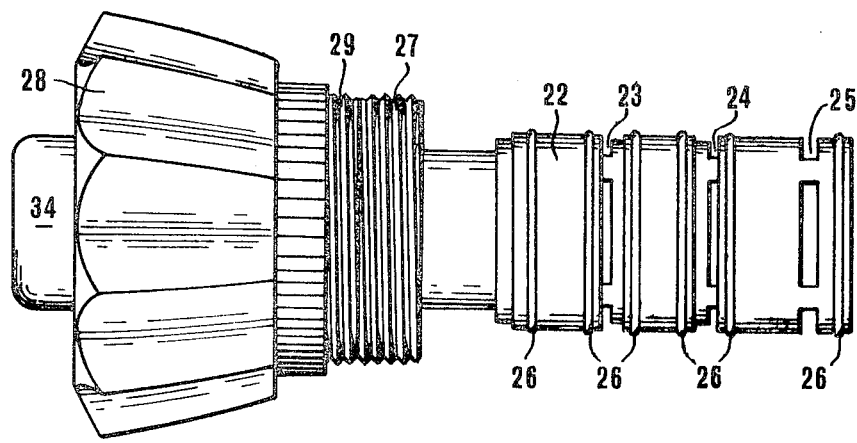
Fig. 6

THERMOSTATIC MIXING COCK

BACKGROUND OF THE INVENTION

This invention relates to a mixing cock for hot and cold water, of the type which includes a thermostat serving to control the mixing operation so as to ensure the delivery of water at a predetermined temperature.

Among the various problems arising with cocks of this kind there is the problem that to keep the complexity of the internal assembly of the cock within reasonable limits it is necessary to provide in the interior of its stationary body, which has to be connected with the water pipings, a complicated system of passages which require an expensive casting operation while a manufacturing of the cock by means of pressing, followed by relatively unexpensive mechanical operations, would be desirable.

BRIEF SUMMARY OF THE INVENTION

Accordingly, the main object of this invention is to provide a thermostatic cock whose body has a structure of substantial simplicity which may be formed by means of pressing (or by means of an economical casting process) and successive simple mechanical operations, and particularly to provide such thermostatic cock while still maintaining the most possible simplicity of the internal assembly of the cock, a high efficiency and also the possibility of a particularly easy disassembly of the cock.

This object is attained according to the invention by means of a thermostatic mixing cock of the type comprising a hollow stationary body provided with inlet unions for hot and cold water and a delivery union for the mixed water and communication passages between said unions and the cavity of the body, and comprising a control element in the form of a hollow plug axially movable within said body, provided with passages for the hot and the cold water and containing in its interior a thermostatic control device, said thermostatic mixing cock being characterized in that the passages for the hot and the cold water, both in the stationary body and in the movable plug, are spaced in axial direction in respect of each other; that in the intermediate region between said passages for the hot and the cold water there is interposed between the stationary body and the movable plug a tubular ring provided on its outside with a gasket adapted to separate the passages for the hot and the cold water of the body; that a disassemblable body portion is provided which is adapted to fasten in position said tubular ring; that between the tubular ring and the disassemblable body portion as well as between the tubular ring and the stationary body there are provided a plurality of radial passages which serve for the hot and the cold water respectively; and that the inner diameters of said tubular ring and of those parts of the cavities of the stationary body and of the disassemblable body portion which are destined to cooperate with the movable plug, are all substantially equal to each other.

Preferably said radial passages are defined by notches provided on the tubular ring, the stationary body or the disassemblable body portion.

Thus, the above mentioned tubular ring: (a) provides a positive separation between the hot and the cold water pipings, (b) defines, by means of its notches, fractionate passages which contribute to the limitation of the noise, (c) forms, through the so obtained limitation of the individual passage sections, a protection filter for the inner parts of the cock, (d) ensures, by virtue of the mentioned equality of the inner diameters, a passage without deterioration of the gaskets with which the plug may be provided in correspondence of the passage openings, and (e) acts as a spacer between the stationary body and the disassemblable body portion which may advantageously contain in its interior the means for the control of the axial displacement of the plug. Such tubular ring can easily be manufactured by moulding or pressure die-casting of an anticalcareous synthetic material and its industrial production cost is minimal. The provision of said tubular ring allows simplifying to a maximum degree the structure of the stationary body and its manufacture, particularly because of the separation thus obtained between the passages for the hot and the cold water and because of the fact that the necessary annular distribution chambers which communicate with the water passages are defined by the tubular ring itself between its notches and the stationary body. In consequence of this structural simplification the stationary body can be formed economically by pressing, inclusive the water passages which may be defined by dead holes formed during the pressing operation and successively opened when turning the inner cavity of the body.

Furthermore, by virtue of above described features it is possible to provide a cock in which the counterpressures are completely compensated and the closure of the hot and cold water inlets is effected in synchronism, while still having the possibility to obtain, by means of a different relative admeasurement of the openings, an initial prevalence of cold water at the moment of turning on the cock, such as to compensate the so-called thermic shock caused by the inertia of the thermostatic element, said cock presenting furthermore the feature of allowing to withdraw all parts without the use of special tools, and, eventually, without using any tools at all.

BRIEF DESCRIPTION OF THE DRAWINGS

These and other characteristics of the cock according to the invention will be better understood from the following description with reference to an illustrative, but not limitative embodiment diagrammatically shown in the accompanying drawings, in which:

FIGS. 3, 4 and 5 show separately in axial section the stationary body of the cock, the tubular ring and the disassemblable body portion, and FIG. 6 shows a view of the inner assembly of the cock, which may be withdrawn integrally from the body.

DETAILED DESCRIPTION OF THE PREFERRED EMBODIMENT

Figure 1:
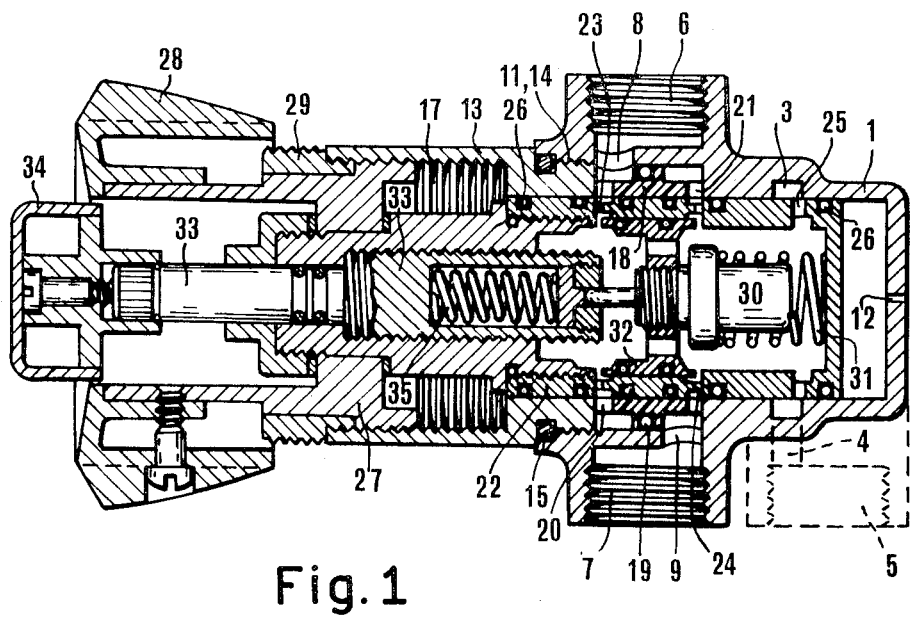
FIG. 1 shows an axial section of the cock in the opened position.
Figure 2:
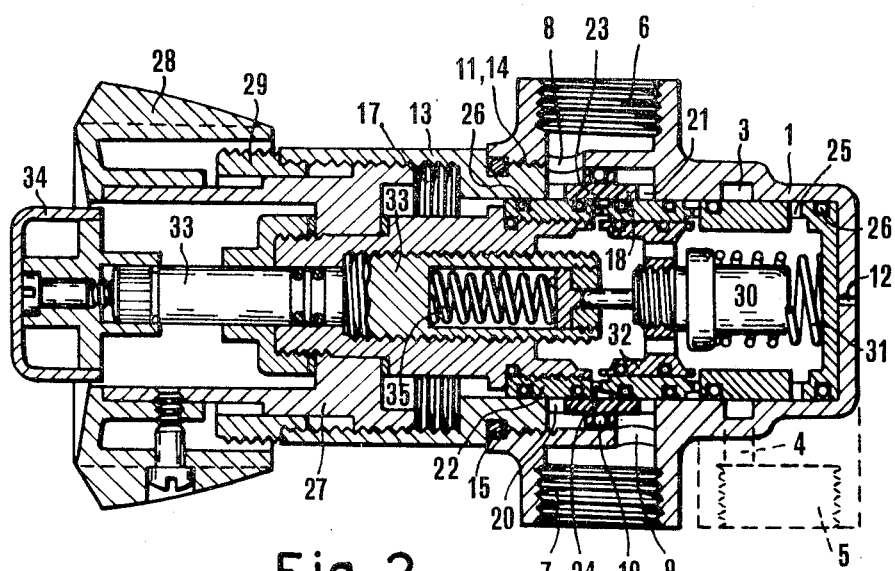
FIG. 2 shows a similar section of the same cock, but in the closed position.

Referring now particularly to FIG. 3, the stationary body 1 of the cock, which is intended to be fixedly connected to the water pipings and eventually incorporated in a wall, is provided with an inner cavity whose deeper part 2 is intended to cooperate with the inner control member and is interrupted by an annular recess 3 which, through a port 4, communicates with an outlet union 5. The outlet union 5, which is situated in a plane different from that of the section, is, for the purpose of clarity, represented by dashed lines in FIGS. 1 and 2 as if it was situated in the plane of the section. Furthermore, the body 1 is provided with two inlet unions 6 and 7 for the hot and the cold water, which unions are generally coaxial in order to facilitate the installation, said unions being in communication, through ports 8 and 9, which are staggered in axial direction in respect to each other, with the part 10 situated nearer to the mouth of the cavity of body 1, which part 10 has a larger diameter than the deeper part 2 of the cavity. A screw thread 11 is provided in the proximity of the mouth of the cavity. A breather hole 12 is formed in the bottom of body 1. As it can be seen, the strucutre of the body 1 is very simple and well adapted to be manufactured by pressing and successive mechancial operations. Openings of ports 4, 8 and 9 for the purpose of communication with the delivery and inlet unions is performed by the operation of turning of the inner cavity 10 and the annular recess of cavity 2.

Said stationary body portion 1–12 is completed, when the cock is mounted, with a disassemblable body portion 13 (FIG. 5) which is provided with a screw thread 14 to be screwed in the screw thread 11 of body 1, a gasket 15 providing seal in respect of the body 1, a bored inner cavity 16 having the same diameter as the cavity 2 of the body 1 and serving to cooperate with the inner control member, and an internally threaded portion 17 which is intended to receive the means for the displacement of the control member which will be described later.

When assembling the cock, a tubular ring 18 (FIG. 4) is inserted into the cavity 10 of body 1, which has a larger diameter; said tubular ring is provided on its outer part with a gasket 19 which has to be positioned in the body 1 in an intermediate position, in axial direction, between the ports 8 and 9 which it thus separates positively by dividing the cavity 10, around the ring 18, in two annular chambers which communicate respectively with the inlet unions for the hot and the cold water. The ends of the ring 8 are ragged by notches 20 and 21 defining a plurality of narrow radial passages which serve respectively for the hot and the cold water and act as flow dividers as well as a filter for retaining the coarser impurities which could damage the cock. The annular ring 18, tightened between the stationary body 1 and the disassemblable body portion 13, acts as a spacer between these two parts. The inner diameter of the cavity portion 2 of the stationary body 1, the inner diameter of the cavity 16 of the disassemblable portion 13 and the inner diameter of the tubular portion of the ring 18 are substantially equal to each other and, when the cock is closed, define a single cylindrical surface almost without discontinuities, except for the passages defined by the notches 20 and 21, so that in said cylindrical surface the gaskets of the control member may slide without being subject to deterioration.

The control member of the cock, which is intended to be inserted in the cylindrical cavity described above, has the form of a cylindrical hollow plug 22 provided with axially spaced slots 23 and 24 for the passage of the cold and the hot water, as well as with slots 25 for the delivery of the mixed water. Preferably, these slots open, in the interior of the valve, into recesses having a larger width. On the skirt of the plug 22 are mounted suitable gaskets 26 serving to separate the operation zones of the various slots 23-25 in respect to each other and in respect to the outside. The plug 22 is mounted axially movable in the body 1-21 comprising the stationary portion 1, the disassemblable portion 13 and the ring 18. In one position (FIG. 1), the slots 23 are situated in face of the passages formed by the notches 20 of the ring 18, the slots 24 are situated in face of the notches 21, and the slots 25 correspond with the annular recess 3 of cavity 2, so that the maximal passage of water is obtained. Conversely, in another position, axially displaced in respect of the first(FIG. 2), the gaskets 26 isolate the above mentioned slots thereby preventing any passage of water. In the intermediate positions the gaskets 26 throttle more or less the passages defined by the notches 20 and 21 thereby providing the various desired intermediate delivery rates. The provision of slots 25 also for the delivery of the mixed water, and of a breather hole 12 on the bottom of body 1, together with the constancy of the diameter of the whole cylindrical cavity 2–18–16 in which the plug is lodged, ensure a complete compensation of the pressures.

In order to control the axial displacement of the plug 22, the latter is axially fixed to a threaded piece 27 which may be screwed into the screw thread 17 of the disassemblable portion 13 of the cock body and is in turn fixedly connected to an operation handle 28. As obvious, control of the axial displacement of plug 22 and consequently of the delivery rate adjustment is accomplished by rotating the handle 28 and therewith the threaded piece 27. A threaded ring 29, screwed into the same screw thread 17 of the disassemblable portion 13 of the body, limits the possibility of unscrewing the threaded piece 27, thereby preventing the accidental disassemblage of the cock, whereas the simple unscrewing of the threaded ring 29, which may, for instance, be knurled, allows to withdraw the whole inner assembly of the cock, as shown in FIG. 6, for the purpose of replacing the gaskets or effecting repairs, maintenance or replacement of parts or of the whole.

In the interior of the plug 22 there is provided a thermostatic device, well known in itself, comprising a thermometric expansion bulb 30 pushed by a spring 31 and fixedly connected to a distribution valve 32, the axial displacement of which modifies the ratio between the free passage sections available for the water which penetrates into the plug through the slots 23 and 24 respectively, thereby modifying the mixing proportions in such a manner as to maintain at a predetermined value the temperature of the mixed water which is then delivered through the slots 25 after having lapped the thermometric bulb 30. The adjustment of the temperature of the delivered water is achieved by means of a screw 33 screwed into the plug 22, which screw acts on the end of the bulb 30, which is opposite to the spring 31, and terminates at the outside with an operation knob 34, the rotation of which produces the modification of the adjustment of the thermostat. The screw 33 contains in its interior the well known safety spring 35 which serves to prevent overcharges of the bulb 30.

Through unequal admeasurement of the slots 23 and 24 which are provided on plug 22 for the inlet of the hot and the cold water, it is possible to ensure an initial prevalence of the cold water ratio, under the circumstances of turning on the cock in a cold condition, so as to balance the excess of temperature of the delivered water, which excess, under such conditions, tends to be produced because of the considerable thermic inertia of the thermometric bulb 30.

Obviously, various modifications of the executional particulars and the arrangements of the cock may be effected without departing from the scope of the invention and of the present patent. Particuarly, one or both notches 20 and 21, which have been shown as situated at the ends of the ring 18, could instead be provided respectively on the stationary body 1 and/or the disassemlable body portion 13. In certain cases they could also be replaced by perforations formed in the ring 18. Furthermore, the thermostatic device situated within the plug 22 may be replaced by a device of a different type. Also the arrangement of the unions 5–7 of the body 1 may vary, owing to the fact that their location is not bound to any particular position and that they may be distributed in any suitable manner around the body and directed radially, tangentially, axially or inclined in any desired manner in view of the best possibility of installation.

Having thus described my invention, what I claim is:

1. A thermostatic mixing cock comprising: a hollow stationary body portion having inlet unions for hot and cold water; a delivery union for mixed water; a first portion of inner cylindrical cavity; a second coaxial portion of inner cylindrical cavity having a diameter greater than the diameter of said first portion of cavity; a communication passage between said delivery union and said first portion of cavity; communication passages between each of said inlet unions and said second portion of cavity, each of said passages being spaced from each other in the axial direction of said first and second portions of cavity; a tubular ring inserted in said second portion of cavity, having an outer sealing gasket seated against said second portion of body cavity in a region thereof intermediate between said passages communicating with said inlet unions for hot and cold water, and having a coaxial inner cylindrical cavity substantially of the same diameter as said first portion of stationary body portion cavity; a hollow disassemblable body portion connected to said stationary body portion, contacting said tubular ring, and having an inner end portion of coaxial inner cylindrical cavity substantially of the same diameter as said first portion of stationary body portion cavity; a first plurality of radial passages between said stationary body portion and said tubular ring; a second plurality of radial passages between said disassemblable body portion and said tubular ring; a control member in the form of a hollow plug housed and axially movable within said first portion of cavity of the stationary body portion, said cavity of said tubular ring and said portion of cavity of the disassemblable body portion forming in their whole a substantially uniform cylindrical cavity; said hollow plug having a substantially cylindrical inner cavity and first and second axially spaced radial passages communicating from said inner cavity of the plug towards the outside, a control valve axially movable within the inner cavity of said plug, said control valve throttling said first and second radial passages of the plug according to its own axial position; and a thermometric bulb housed in said plug cavity in operational relationship with said control valve, said thermometric bulb and control valve thus forming a thermostatic control device.

2. A thermostatic mixing cock as set forth in claim 1, wherein said first and second pluralities of radial passages are formed by notches provided on the ends of said tubular ring.

3. A thermostatic mixing cock as set forth in claim 1, wherein said tubular ring is made of a synthetic plastic material.

4. A thermostatic mixing cock as set forth in claim 1, wherein said second cavity portion of said stationary body portion has, on the side opposite said first cavity portion, an inner screw thread, and said disassemblable body portion has an outer screw thread complementary to said inner screw thread of the stationary body portion, said tubular ring being axially fixed within said second cavity portion of the stationary body portion upon screwing said disassemblable body portion into said stationary body portion.

5. A thermostatic mixing cock as set forth in claim 1, wherein said radial passages of the plug are shaped as slots, and further comprising annular sealing gaskets lodged on the outside of said plug between said slots and between each slot and the nearest end of the plug.

6. A thermostatic mixing cock as set forth in claim 5, wherein said slots expand towards the inside of the plug into recesses forming distribution chambers.

7. A thermostatic mixing cock as set forth in claim 5, wherein said plug further has outlet slots for delivering the mixed water, and a sealing gasket lodged on the outside of said plug between said outlet slot and the nearest end of the plug; and wherein a bottom wall of said first portion of inner cavity of the stationary body portion has a breather hole for the compensation of the pressures.

8. A thermostatic mixing cock as set forth in claim 1, wherein said disassemblable body portion has an inner screw thread, and further comprising a threaded piece screwed into said inner screw thread of the disassemblable body portion, connected to said plug and having an operation handle for controlling the axial position of said plug, and a threaded ring also screwed into said inner screw of the disassemblable body portion for preventing accidental disassembling of the cock.

9. A thermostatic mixing cock as set forth in claim 1, wherein said thermostatic control device comprises said control valve, said thermometric bulb connected to said control valve, a spring operatively inserted between said thermometric bulb and a bottom portion of said plug, and an adjustment screw, screwed into said plug, having an outer operation knob and acting upon an end of said thermometric bulb, opposite said spring.

10. A thermostatic mixing cock as set forth in claim 9, wherein said adjustment screw has an inner cavity, and a safety spring is housed within said inner cavity of the adjustment screw and is operatively inserted between said adjustment screw and said end of the thermometric bulb.

11. A thermometric mixing cock as set forth in claim 1, wherein said first and second axially spaced radial passages provided in the plug are somewhat differently admeasured, with the passage for the cold water slightly larger than the one for the hot water, in order to compensate for the thermic inertia of the thermometric bulb.

* * * * *